United States Patent
Villeneuve et al.

(10) Patent No.: US 9,616,627 B2
(45) Date of Patent: Apr. 11, 2017

(54) MOLD COMPRISING A CAVITY FOR MOLDING A DEVICE FOR CLOSURE IN A GROOVE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Bernard Villeneuve, Clermont-Ferrand (FR); Gaël Roty, Tokyo (JP); Ludovic Greverie, Tokyo (JP)

(73) Assignees: COMPAGNIE GENERALE DES ETABLISSEMENTS MICHELIN (FR); MICHELIN RECHERCHE ET TECHNIQUE S.A. (CH)

( * ) Notice: Subject to any disclaimer, the term of this patent is extended or adjusted under 35 U.S.C. 154(b) by 493 days.

(21) Appl. No.: 14/360,483

(22) PCT Filed: Nov. 23, 2012

(86) PCT No.: PCT/EP2012/073435
§ 371 (c)(1),
(2) Date: May 23, 2014

(87) PCT Pub. No.: WO2013/076233
PCT Pub. Date: May 30, 2013

(65) Prior Publication Data
US 2014/0328960 A1    Nov. 6, 2014

(30) Foreign Application Priority Data

Nov. 25, 2011  (FR) ..................... 11 60778

(51) Int. Cl.
*B29D 29/00* (2006.01)
*B29D 30/06* (2006.01)

(52) U.S. Cl.
CPC .... *B29D 30/0606* (2013.01); *B29D 2030/061* (2013.01); *B29D 2030/0612* (2013.01)

(58) Field of Classification Search
CPC ............ B29D 30/0606; B29D 30/0607; B29D 2030/061; B29D 2030/0602
See application file for complete search history.

(56) References Cited

U.S. PATENT DOCUMENTS

| 5,800,642 A | 9/1998 | Ohya |
| 6,119,744 A | 9/2000 | Tsukagoshi |
| 2012/0114777 A1 | 5/2012 | Villeneuve et al. |

FOREIGN PATENT DOCUMENTS

| FR | 2715891 A1 | 8/1995 |
| JP | 5131813 A | 5/1993 |
| WO | 2010146180 A1 | 12/2010 |

OTHER PUBLICATIONS

PCT/EP2012/073435, International Search Report (ISR), Form PCT/ISA/210, dated Feb. 12, 2013 (including English translation), 7 pgs.

*Primary Examiner* — Joseph S Del Sole
*Assistant Examiner* — John Robitaille
(74) *Attorney, Agent, or Firm* — Dickinson Wright PLLC

(57) ABSTRACT

A molding element for a mold for vulcanizing a tread of a tire, comprising a base able to mold part of the tread surface of the tread and a bar able to mold a groove in the tread, the bar comprising two lateral faces extending along its length and projecting from the base and an upper face connecting the lateral faces. The molding element comprises a contact edge formed by the base and the bar, intended to come into contact with another molding element to form all or part of the vulcanizing mold, and further comprising at least one recess in the bar, which opens onto one of the lateral faces and onto the contact edge, but does not open onto the upper face of the bar.

12 Claims, 5 Drawing Sheets

MOLD COMPRISING A CAVITY FOR MOLDING A DEVICE FOR CLOSURE IN A GROOVE

This application is a 371 National Stage Application of PCT/EP2012/073435, filed Nov. 23, 2012, which claims the benefit of FR1160778, filed Nov. 25, 2011, the entire contents of each of which are incorporated herein by reference for all purposes.

BACKGROUND

1. Field

The present field relates to the field of the manufacture of a mold for a tire comprising a plurality of cavities which are able to mold closure devices in one or more groove(s) of this tire. More particularly, the field relates to the manufacture of a mold formed from a plurality of molding elements.

2. Description of Related Art

Document WO 2010146180 discloses a vulcanizing mold for a tire comprising a plurality of molding elements. Each molding element is delimited by two edges in contact with two other adjacent molding elements so that once the molding elements are in contact with one another, all of these molding elements together allow all or part of the tread of the tire to be molded.

Each molding element comprises a base and a bar projecting from this base. The base is intended to mold the tread surface of the tread of the tire and the bar is intended to mold a groove in the tread of this tire, i.e. a cut of a width greater than or equal to 2 mm.

It is known that, in the contact patch in which the tread is in contact with the road surface, each groove forms a resonance tube with this road surface. This resonance tube amplifies the running noise of the tire, and this may be unpleasant for people situated inside the vehicle and/or outside this vehicle.

In order to limit the intensity of this resonant noise, it is known practice to provide the grooves with special closure devices also referred to as "flexible walls", or "flaps". These closure devices take the form of thin blades. These blades partially close off the cross section of the grooves when the tire is running on a dry road surface. When it is running on a wet road surface, the blades flex under the action of the flow of water, so that this water can be removed from the contact patch. The grip of the tire on the road surface is thus maintained even when running under severe wet conditions.

There are various types of devices for closing a groove. For example, document WO 2010063749 discloses closure devices which are fixed by their base to a bottom of a groove. It has been found that the flexibility of these devices changes over time. Thus, with tire wear, the height of these closure devices decreases, thus causing their rigidity to increase. These closure devices may therefore ultimately prevent water from circulating properly in the groove.

In order to improve the operation of the closure devices on a wet road surface, document FR2715891 has proposed closing the cross section of the groove using two closure devices belonging to one and the same transverse plane and each one covering approximately half the cross section of this groove. These closure devices are fixed respectively to lateral walls of the groove and not to the bottom of this groove. Thus, with tread wear, the region of attachment of each closure device to the associated wall of the groove decreases. The flexibility of the closure device is maintained over time, or even increased, until a certain degree of tread wear is reached.

However, in order to mold these closure devices into a groove, it is necessary to make slots in the lateral faces of a bar of a mold, it not being appropriate for these slots to open onto the upper surface of this bar. Now, creating these slots with the required degree of precision is accompanied by a great many difficulties.

It is therefore an object of embodiments of the invention to make it easier to manufacture a mold capable of molding into a tire tread closure devices that are attached to lateral walls of a groove.

DEFINITIONS

A "tire" means all types of resilient tread whether or not it is subjected to an internal pressure.

The "tread" of a tire means a quantity of rubber material delimited by lateral surfaces and by two main surfaces one of which is intended to come into contact with a road surface when the tire is being driven on.

A "tread surface" means the surface formed by those points of the tread of the tire that come into contact with the road surface when the tire is being driven on.

A "mold" means a collection of separate molding elements which, when brought relatively closer together, make it possible to delimit a toroidal molding space.

A "molding element" means part of a mold. A molding element is, for example, a mold segment.

A "base" means that part of the molding element that comprises a molding surface able to mold the tread surface of the tread of the tire. The base notably comprises attachment means intended to attach the molding element to the rest of the mold.

A "bar" means a protuberance projecting from the base and of a width greater than or equal to 2 mm. The bar is intended to mold a groove in the tread of the tire.

A "cavity" in a mold means a hollow volume delimited by walls of the mold. This cavity is able to mold a closure device in a groove molded by a bar.

A "recess" in a bar means a hollow in the bar that opens onto a contact edge of the molding element. This recess is able to be closed at the contact edge of this molding element by another molding element with a view to forming a cavity.

A "contact edge" of a molding element means a surface of the molding element that is intended to come into contact with another molding element to form all or part of a vulcanizing mold.

SUMMARY

The invention in certain embodiments relates to a molding element for a mold for vulcanizing a tread of a tire. The molding element comprises a base able to mold part of the tread surface of the tread and a bar able to mold a groove in the tread. This bar comprises two lateral faces extending along the length of the bar and projecting from the base and an upper face connecting the lateral faces. The molding element comprises a contact edge formed by the base and the bar. This contact edge is intended to come into contact with another molding element to form all or part of the vulcanizing mold. The molding element further comprises at least one recess in the bar. This recess opens onto one of the lateral faces of the bar and onto the contact edge of the molding element. This recess does not open onto the upper face of the bar.

The recess formed in the molding element is able to be closed by another molding element of the mold to constitute a cavity for molding a closure device. Furthermore, each recess may be formed by conventional means such as mechanical machining, electron discharge machining or punching.

The invention therefore makes it possible to form molding cavities in a mold and do so in a simple and practical manner.

In addition, given that the recess in the molding element opens onto the edge of this molding element, the walls of the molding element delimiting this recess are readily accessible, notably before this molding element is assembled in the mold. Thus, it is possible to coat these walls with a non-stick coating, such as xylan. By using this non-stick coating, the demolding of the closure devices is improved.

In an alternative form of embodiment, the molding element comprises in the bar a first recess and a second recess. Each recess opens respectively onto one of the lateral faces of the bar and onto the contact edge of the molding element. Neither one of these recesses opens onto the upper face of the bar.

The molding element thus comprises two recesses, each recess opening respectively onto one of the lateral faces of the bar. A pair of closure devices attached respectively to two opposite lateral walls of the groove molded by the bar can thus be produced easily, each device then being suited to closing part of the cross section of this groove.

In an alternative form of embodiment, the molding element comprises a third recess arranged in the bar between the first recess and the second recess. This third recess opens onto the upper face of the bar and onto the contact edge of the molding element. This third recess does not open onto lateral faces of the bar.

The invention therefore allows ease of molding of three closure devices extending in one and the same transverse plane in a groove. This is particularly advantageous when the cross section of the groove is of great width, for example more than 15 mm wide. With such a groove width, the use of just two closure devices respectively attached to two opposite lateral walls of the groove and having in a transverse direction a dimension equivalent to around half the width of this groove may present problems in terms of durability. This is because the movements of the closure devices which are brought about by alternating driving on dry road surfaces and on wet road surfaces may generate stress concentrations at the base of each closure device. There is therefore ultimately a risk of cracks appearing at these bases. By providing a third closure device arranged between the first closure device and the second closure device the transverse dimension of this first closure device and of this second closure device is reduced. The stresses that these two closure devices have to withstand are therefore lower and they therefore work better over time.

In an alternative form of embodiment, the molding element comprises an air discharge duct. This discharge duct extends the recess or each recess throughout the thickness of the base.

This then ensures that air trapped in the recess or recesses is properly discharged when the tire is vulcanized.

In an alternative form of embodiment, the molding element comprises means of adjusting the dimensions of the air discharge duct.

This then makes sure that the air is correctly discharged when the tire is vulcanized while at the same time preventing rubber from escaping along the discharge duct. This then prevents any surplus rubber molded by the discharge duct from being formed on the upper part of the closure device. Indeed such a surplus of rubber could detract from the correct operation of this closure device.

In an alternative form of embodiment, the molding element comprises means of adjusting the height of the recess or of each recess in the bar.

As the tire cools once it has been molded, it may happen that the closure device shrinks, thereby altering its height in the groove of the tire. The significance of this shrinkage phenomenon is difficult to quantify. This is because this phenomenon is dependent on numerous factors such as the volume of rubber that forms the closure device, the vulcanization temperature conditions and the rubber composition used. In order to give the tire a uniform appearance when the tire is in the as new condition, it is advantageous to make the upper part of the closure device lie flush with the tread surface of the tread. By providing means of adjusting the height of the recess it is possible, through trial and error, to obtain a closure device at a suitable height to guarantee the tire a uniform appearance.

Another embodiment of the invention relates to a mold for vulcanizing a tread of a tire comprising a plurality of molding elements. These molding elements are in contact with one another to form a molding surface able to mold a tread surface of the tread of the tire. These molding elements also form at least one bar able to mold a groove in the tread. This bar comprises two lateral faces extending along the length of the bar and projecting from the molding surface and an upper face connecting the said lateral faces. The mold that forms the subject of the invention is notable in that it comprises at least one cavity able to mold a closure device intended to close off all or part of a cross section of the groove molded by the bar. This cavity opens onto one of the lateral faces of the bar and does not open onto the upper face of this bar so that the closure device molded by the cavity is integral only with a lateral wall of the groove. The cavity is delimited by walls belonging to two molding elements in contact with one another and at least one of the said molding elements is a molding element as described hereinabove.

It is thus possible to manufacture, in a simple and practical manner, a mold capable of molding closure devices in the tread of a tire.

In an alternative form of embodiment, the mold comprises at least two cavities offset from one another along the length of the bar, each cavity opening respectively onto one of the lateral faces of this bar.

It is thus possible to mold in the groove two closure devices which are offset along the length of this groove. This then ensures that the closure devices will not impede one another in their opening and closing movements.

In an alternative form of embodiment, the width of the cavity is comprised between 0.1 mm and 2 mm.

It is thus possible to mold closure devices of small thickness. This small thickness of the closure devices gives them a good ability to flex when driving over a wet road surface.

Another subject of the invention is a tread of a tire which is molded and vulcanized using the mold as described hereinabove.

BRIEF DESCRIPTION OF THE DRAWINGS

Other features and advantages of the invention will become apparent from the following description, given by way of nonlimiting example, with reference to the attached drawings in which.

DETAILED DESCRIPTION OF SPECIFIC EMBODIMENTS

In the description which follows, elements which are substantially identical or similar will be denoted by identical references.

Figure 1:
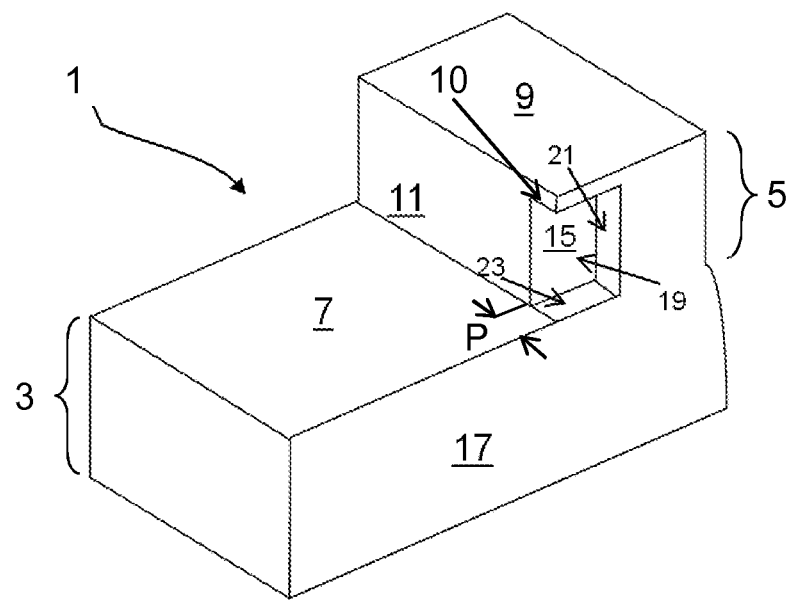
FIG. 1 schematically depicts a partial perspective view of a molding element according to a first embodiment of the invention.

FIG. 1 schematically depicts a perspective view of a molding element 1 of a mold according to a first embodiment of the invention.

The molding element 1 comprises a base 3 and a bar 5 projecting from the said base 3. The base 3 and the bar 5 are in this instance formed as one from the same substance and made of a material of the aluminium type.

More particularly, the base 3 comprises a molding surface 7 intended to mold part of the tread surface of a tire. The bar 5 for its part comprises an upper face 9 intended to mold the bottom of a groove and two lateral faces 11, just one of which is depicted here. These lateral faces 11 project from the molding surface 7 of the base 3 and extend along the length of the bar.

To make the invention easier to understand, the bar 5 has been depicted here as being in the overall shape of a rectangular parallelepiped. Of course, the invention is not restricted to this specific shape of bar. As an alternative, the upper face 9 of the bar may be non-planar, for example domed, so that the bottom of the groove molded by the bar 5 is curved. Similarly, the angle formed by the lateral faces 11 with the molding surface 7 of the base 3 may be other than 90°. For example, each lateral face 11 may form an angle greater than 0° and less than or equal to 45° with a direction normal to the molding surface 7. Furthermore, the lateral faces 11 may comprise parts for connection with the upper face 9. These connection parts are, for example, curved so that it is possible to avoid there being any right angles between the bottom of the groove molded by the upper face of the bar and the longitudinal walls of this groove. This makes it possible to limit the risk of cracks appearing in the groove.

It can be seen from FIG. 1 that the bar 5 has a recess 15. This recess is intended to accommodate raw rubber for molding a closure device in a groove of a tire. The recess 15 here opens onto one of the lateral faces 11 of the bar 5 and onto a contact edge 17 of the molding element 1. By contrast, the recess 15 does not open onto the upper face 9 of the bar 5.

More specifically, the recess 15 is delimited by a transverse wall 19, by a longitudinal wall 21, by a lower wall 23 and by an upper wall (not visible in FIG. 1) belonging to a protrusion 10 extending the upper face 9 of the bar. The transverse wall 19 here is perpendicular to the longitudinal wall 21. As an alternative, it is possible for the transverse wall 19 to make an angle other than 90° with the longitudinal wall 21.

It will also be noted that the depth P of the recess 15, i.e. the dimension of this recess in the length of the bar, is constant here and is comprised between 0.1 mm and 1 mm. As an alternative, the depth of the recess 15 may vary in the height of the recess 15. This is notably possible when the transverse wall 19 makes an angle other than 0° with a direction normal to the lower wall 23.

Figure 2:
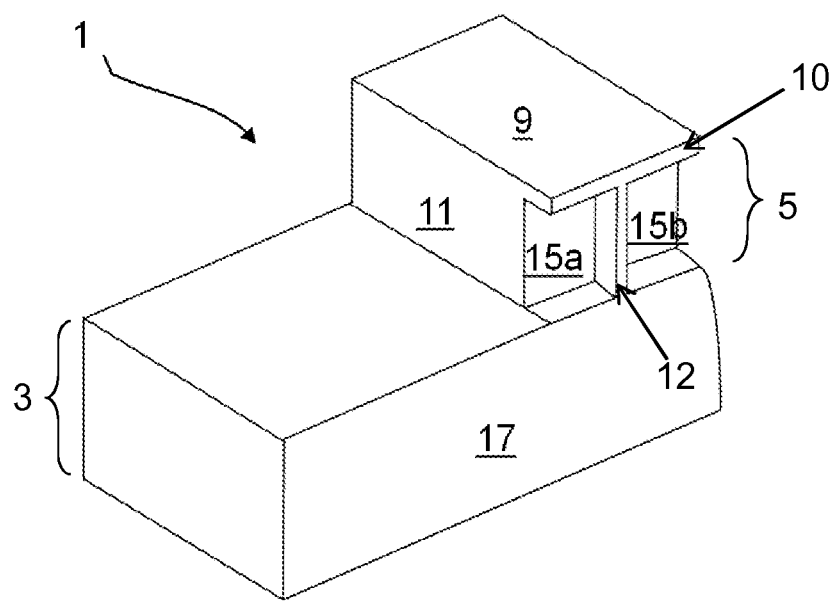
FIG. 2 schematically depicts a partial perspective view of a molding element according to a second embodiment of the invention.

FIG. 2 shows an alternative form of embodiment of the molding element 1 comprising two recesses 15a, 15b. Each of these recesses opens respectively onto one of the lateral faces 11 of the bar 5 and onto the contact edge 17 of the molding element. Neither one of these recesses 15a, 15b opens onto the upper face 9 of the bar 5. Each recess 15a, 15b is delimited by a protrusion 10 extending the upper face 9 of the bar 5 and by a dividing wall 12 connecting the base 3 to the protrusion 10 and separating the two recesses 15a and 15b. Thus, thanks to the molding element of FIG. 2, it is possible to mold two closure devices in one and the same groove, each of these devices being able to close off part of the cross section of this groove. The dimensions of the two recesses 15a, 15b are identical here. As an alternative, the dimensions of these two recesses may be different.

Figure 3:
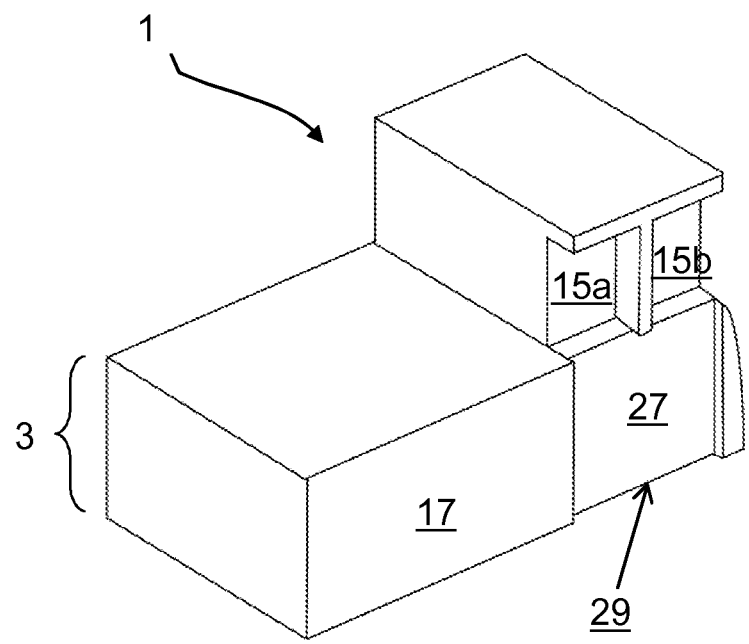
FIG. 3 schematically depicts a partial perspective view of a molding element according to a third embodiment of the invention.

FIG. 3 shows an alternative form of embodiment in which the molding element of FIG. 2 further comprises an air discharge duct 27 extending the recesses 15a and 15b throughout the thickness of the base 3. Thus, the discharge duct 27 opens onto an external surface 29 of the base. This external surface 29 is able to come into contact with the air when the molding element 1 is in use, and more particularly when the mold is closed during the vulcanizing step. It will be noted that the depth of the discharge duct 27, i.e. the dimension of the duct along the length of the bar, is of the order of 0.03 mm. It will also be noted that this duct 27 is depicted here as opening onto the contact surface 17 of the molding element. As an alternative, the discharge duct 27 may not be open ended and may be delimited entirely by the base 3.

In an alternative form of embodiment that has not been depicted, the molding element 1 may comprise an obstructing shim extending along the length of the discharge duct 27. This shim thus allows the cross section of the discharge duct to be adjusted in order to avoid any ingress of raw rubber into this duct during the vulcanizing operation while at the same time allowing air to be discharged from the mold. The obstruction shim may be of different thicknesses according to the raw rubber composition used. It will also be noted that this obstruction shim may be formed from the same material as the molding element and it is fixed to this molding element by adhesive bonding, screw fastening or any other means.

Figure 4:
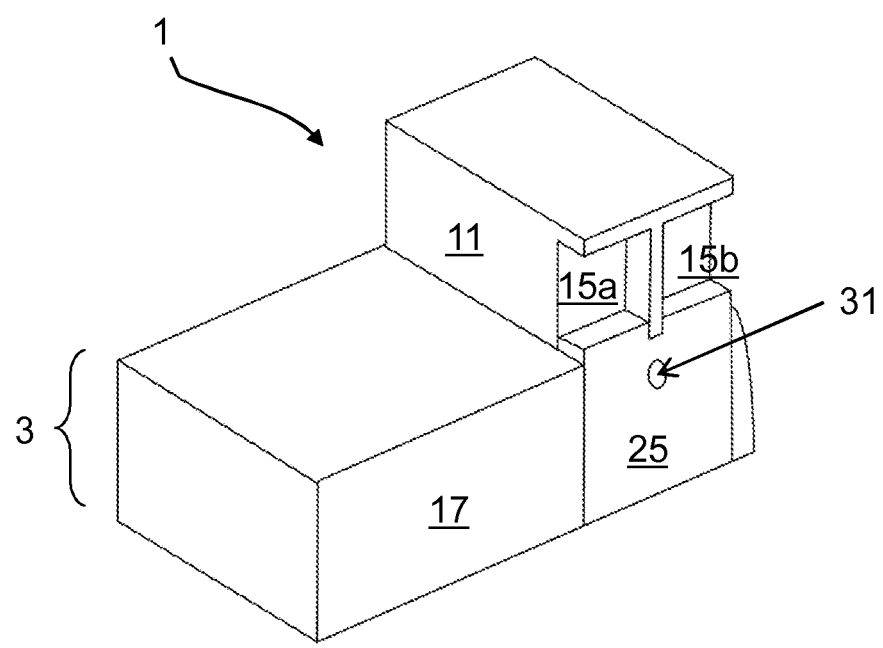
FIG. 4 schematically depicts a partial perspective view of a molding element according to a fourth embodiment of the invention.

FIG. 4 shows an alternative form of embodiment in which the lower wall of each recess 15a, 15b is formed by an adjusting shim 25. This adjusting shim 25 has a height determined according to the height that the closure devices molded by the recesses 15a, 15b are to have. The adjusting shim 25 has a thickness corresponding to the depth of the recesses 15a, 15b. As an alternative, the adjusting shim 25 has a thickness smaller than the depth of these recesses so that this adjusting shim has a wall set back from the contact edge 17 of the molding element 1, thus forming an air discharge duct.

The adjusting shim 25 here has an orifice 31 for the passage of an element for fixing this shim to the rest of the molding element 1, such as a fixing screw. As an alternative, the adjusting shim 25 may be fixed in place by adhesive bonding or by any other means.

Figure 5:
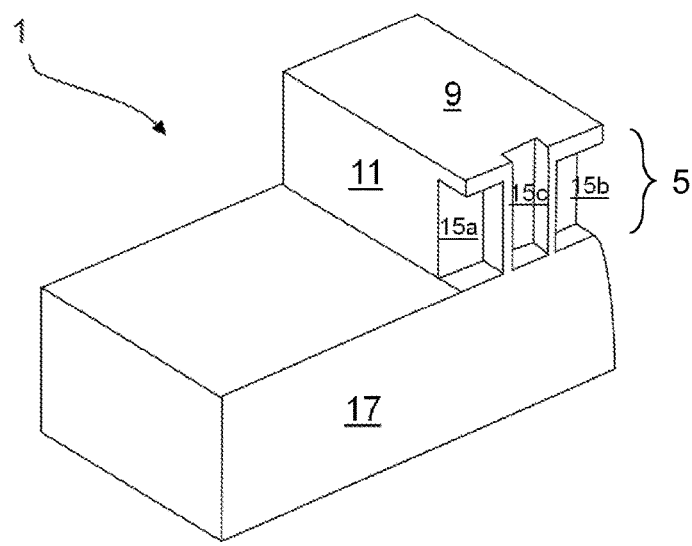
FIG. 5 schematically depicts a partial perspective view of a molding element according to a fifth embodiment of the invention.

FIG. 5 shows an alternative form of embodiment of the molding element 1 of FIG. 2, in which this molding element comprises a third recess 15c arranged in the bar between the first recess 15a and the second recess 15b. This third recess opens onto the upper face 9 of the bar 5 and onto the contact edge 17 of the molding element 1. The third recess does not open onto the lateral faces 11 of the bar 5. Thus, the third recess is able to mold a closure device attached to the bottom of a groove molded by the bar 5, this closure device being arranged in this groove between two closure devices which are attached respectively to the lateral walls of the groove.

The first recess 15a, the second recess 15b and the third recess 15c may have identical depths, i.e. the same dimension measured along the length of the bar. As an alternative, the depths of these recesses 15a, 15b, 15c may be different.

Figure 6:
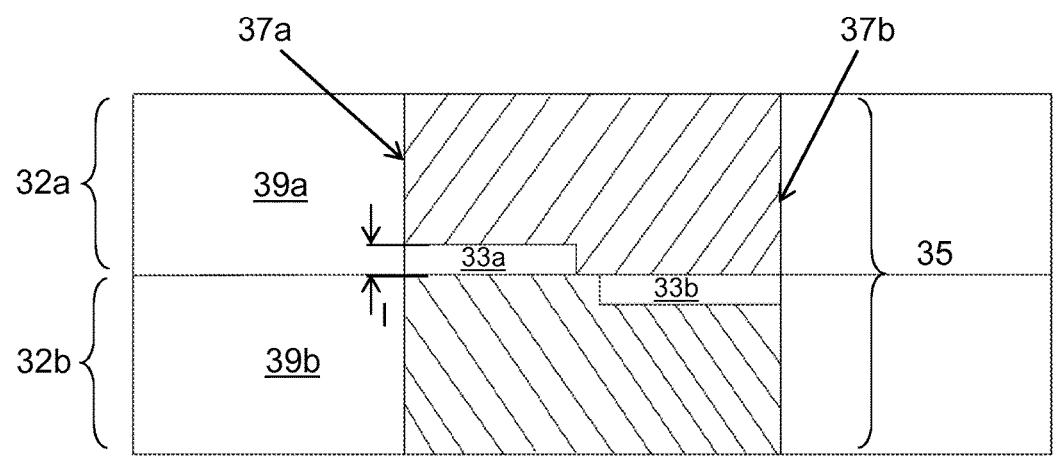
FIG. 6 depicts a view in cross section of two molding elements according to the embodiment of FIG. 1, these two molding elements being assembled to form two molding cavities, these molding cavities being offset along the length of the bar.

FIG. 6 shows an assembly of two molding elements 32a, 32b according to the embodiment of FIG. 1. More specifically, FIG. 6 is a view in cross section of this assembly on a plane substantially parallel to the molding surfaces 39a, 39b of the molding elements 32a, 32b.

Assembling the two molding elements 32a, 32b forms two cavities 33a, 33b which are offset from one another along the length of the bar 35, each cavity 33a, 33b opening respectively onto one of the lateral faces 37a, 37b of this bar 35. More specifically, each cavity 33a, 33b is formed by a recess belonging to one of the two molding elements 32a, 32b, this recess being delimited by a contact edge belonging to the other molding element 32a, 32b.

In an alternative form of embodiment that has not been depicted, assembling two molding elements 32a, 32b forms a single cavity, this cavity being made up of two recesses facing one another and respectively belonging to the two molding elements.

It will be noted that the widths 1 of the cavities 33a, 33b are comprised between 0.1 mm and 2 mm.

Figure 7:
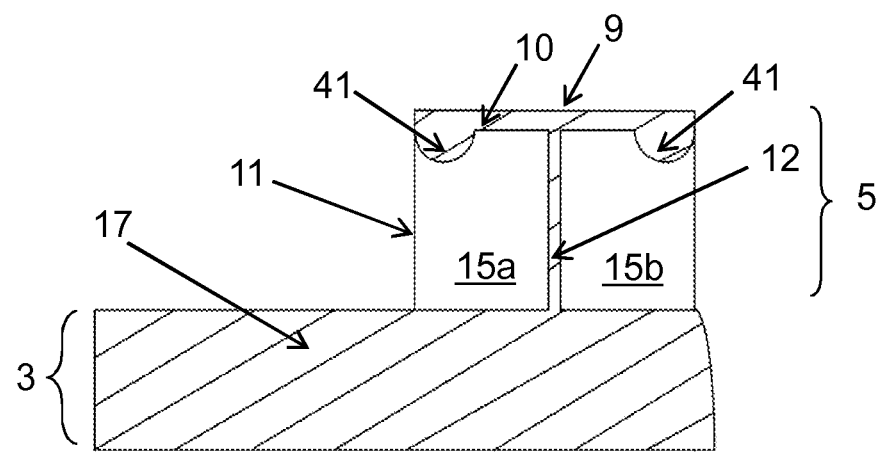
FIG. 7 schematically depicts a partial view of a molding element according to a sixth embodiment of the invention.

FIG. 7 shows an alternative form of embodiment of the molding element of FIG. 2 in which this molding element comprises two protuberances 41 projecting from the protrusion 10. These protuberances 41 are respectively arranged in upper corners of the recesses 15a, 15b at the opposite ends from the dividing wall 12 and they respectively extend the lateral faces 11 of the bar 5. The protuberances 41 are intended to mold notches in the closure devices molded by the molding element. The presence of these notches makes the closure devices easier to remove from the mold while at the same time increasing the flexibility of these devices.

Figure 8:
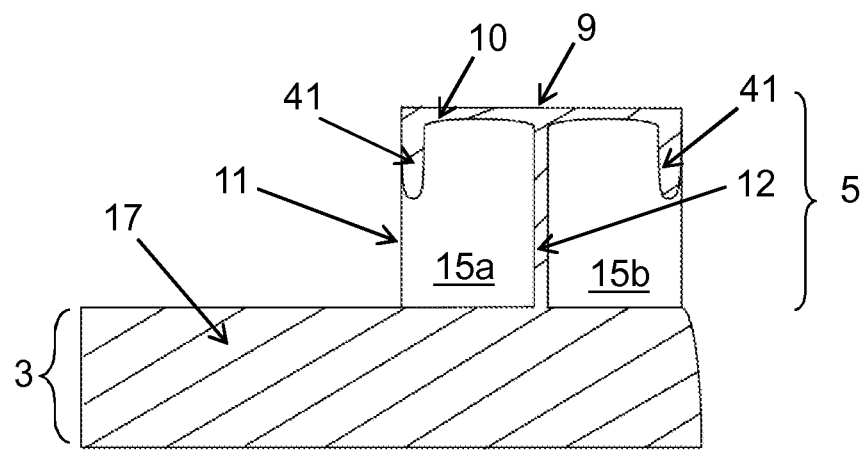
FIG. 8 schematically depicts a partial view of a molding element according to a seventh embodiment of the invention.

The protuberances 41 of FIG. 7 are of semicircular shape. As an alternative, FIG. 8 shows protuberances 41 of oblong shape directed towards the base 3. The closure devices molded by the element of FIG. 8 thus have a more limited zone of attachment to the respective lateral walls of the groove. This then ensures that these closure devices detach more quickly from the tread, notably when this tread is approaching the wear limit.

Figure 9:
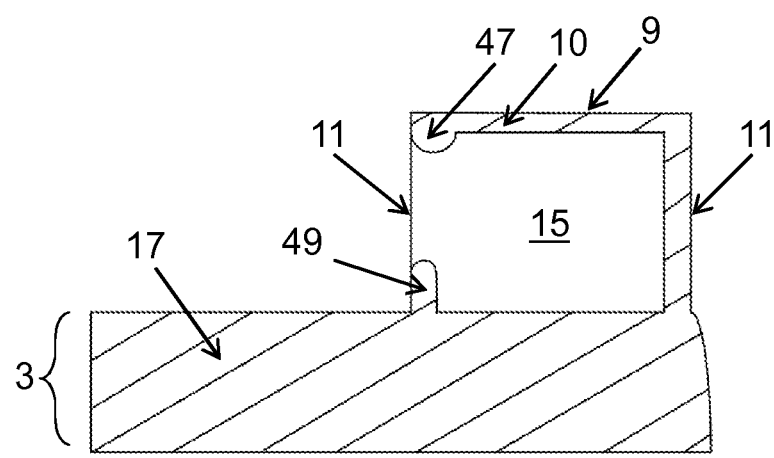
FIG. 9 schematically depicts a partial view of a molding element according to an eighth embodiment of the invention.

FIG. 9 shows an alternative form of embodiment of the molding element of FIG. 1, in which the molding element has two protuberances 47, 49 facing one another, and projecting respectively from the base 3 and from the protrusion 10. These protuberances 47, 49 partially extend the lateral face 11 onto which the recess 15 opens. The closure device molded by the element of FIG. 9 thus has greater flexural flexibility about an axis parallel to the lateral wall of the groove to which the closure device is attached, this parallel axis extending along the height of the groove.

The shape of the protuberances 47, 49 may be semicircular or oblong. As an alternative, the protuberances may have different shapes, as depicted in FIG. 9. All combinations of shape are possible.

Furthermore, in the embodiment of FIG. 9, the recess 15 extends over a large portion of the width of the bar 5, the width of this bar corresponding to the distance separating the two lateral faces 11. As an alternative, the recess 15 may extend over a distance much shorter than the width of the bar 5, such as over half the width of this bar.

The invention also covers tires molded by a mold formed from assembling molding elements as described hereinabove. These tires may be any type of tyre comprising closure devices in grooves, such as tires for passenger vehicles, tires for heavy vehicles, tires for winter driving, for driving in the wet.

The invention is not restricted to the embodiments described and depicted and various modifications can be made thereto without departing from its scope.

The invention claimed is:

1. A molding element for a mold for vulcanizing a tread of a tire, comprising
    a base able to mold part of the tread surface of the tread,
    a bar able to mold a groove in the tread, comprising two lateral faces extending along a length of the bar and projecting from the base and an upper face connecting the lateral faces,
    a contact edge formed by the base and the bar, intended to come into contact with another molding element to form all or part of the vulcanizing mold, and
    at least one recess in the bar, the recess opening onto one of the lateral faces of the bar and onto the contact edge of the molding element, but not opening onto the upper face of this bar.

2. The molding element according to claim 1, wherein the at least one recess of the element comprises a first recess and a second recess, each of these recesses opening respectively onto one of the lateral faces of the bar and onto the contact edge of the molding element, neither one of these recesses opening onto the upper face of this bar.

3. The molding element according to claim 2, wherein the molding element further comprises a third recess arranged in the bar between the first recess and the second recess, the third recess opening onto the upper face of the bar and onto the contact edge of the molding element, but not opening onto lateral faces of the bar.

4. The molding element according to claim 1, wherein the molding element further comprises an air discharge duct, the discharge duct extending the recess or each recess throughout the thickness of the base.

5. The molding element according to claim 4, wherein the molding element further comprises means of adjusting the dimensions of the air discharge duct.

6. The molding element according to claim 1, wherein the molding element further comprises means of adjusting the height of the recess or of each recess in the bar.

7. The molding element according to claim 2, wherein the recesses are delimited by a protrusion extending the upper face of the bar and a dividing wall of the recesses connecting the base to the protrusion, the molding element further comprising two protuberances projecting from this protrusion and arranged respectively one on either side of the dividing wall, these protuberances respectively extending the lateral faces of the bar.

8. The molding element according to claim 7, wherein the protuberances have an oblong shape facing towards the base.

9. The molding element according to claim 1, wherein the recess is delimited by a protrusion extending the upper face of the bar, the molding element further comprising two protuberances facing one another, projecting respectively from the base and from the protrusion, these protuberances extending one of the lateral faces of the bar.

10. A mold for vulcanizing a tread of a tire, comprising a plurality of molding elements, the molding elements being in contact with one another to form a molding surface able to mold a tread surface of the tread of the tire and at least one bar able to mold a groove in the tread, the bar comprising two lateral faces extending along length of the bar and projecting from the molding surface and an upper face connecting the lateral faces, wherein the mold comprises at least one cavity able to mold a closure device intended to close all or part of a cross section of the groove molded by the bar, the cavity opening onto one of the lateral faces of the bar and not opening onto the upper face of the bar so that the closure device molded by the cavity is formed as an integral part only of a lateral wall of the groove and wherein the cavity is delimited by walls belonging to two molding elements in contact with one another and at least one of the molding elements is in accordance with claim 1.

11. The vulcanizing mold according to claim 10, wherein the mold comprises at least two cavities offset from one another along the length of the bar, each cavity opening respectively onto one of the lateral faces of this bar.

12. The vulcanizing mold according to claim 10, wherein the width of the cavity is comprised between 0.1 mm and 2 mm.

* * * * *